(12) United States Patent
Deck et al.

(10) Patent No.: US 10,259,176 B2
(45) Date of Patent: Apr. 16, 2019

(54) SYSTEM AND METHOD ASSOCIATED WITH DRAPE FORMING

(71) Applicant: THE BOEING COMPANY, Chicago, IL (US)

(72) Inventors: Eric E. Deck, St. Louis, MO (US); Steven J. Burpo, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 191 days.

(21) Appl. No.: 15/227,889

(22) Filed: Aug. 3, 2016

(65) Prior Publication Data

US 2018/0036967 A1 Feb. 8, 2018

(51) Int. Cl.
| | |
|---|---|
| *B29C 70/34* | (2006.01) |
| *B29C 70/54* | (2006.01) |
| *B29C 70/36* | (2006.01) |
| *B29C 70/44* | (2006.01) |

(52) U.S. Cl.
CPC ........... *B29C 70/342* (2013.01); *B29C 70/36* (2013.01); *B29C 70/44* (2013.01); *B29C 70/54* (2013.01); *B29C 70/541* (2013.01); *B29C 70/543* (2013.01)

(58) Field of Classification Search
CPC ... B29C 70/342; B29C 70/543; B29C 70/541; B29C 70/54; B29C 70/36; B29C 70/44
USPC ................ 264/313, 316, 510; 425/388–389; 156/222, 285, 385, 583.3
See application file for complete search history.

(56) References Cited

U.S. PATENT DOCUMENTS

| | | | |
|---|---|---|---|
| 5,609,439 A * | 3/1997 | Schreiner | E03F 3/06 156/156 |
| 5,772,950 A | 6/1998 | Brustad et al. | |
| 8,414,280 B2 * | 4/2013 | Pettis | G06F 3/12 264/308 |
| 8,840,393 B2 * | 9/2014 | Wilenski | B29C 70/44 425/111 |
| 2008/0035411 A1 * | 2/2008 | Yamashita | B62D 5/046 180/443 |
| 2011/0088833 A1 | 4/2011 | Guzman et al. | |
| 2011/0259515 A1 * | 10/2011 | Rotter | B29C 70/382 156/285 |
| 2013/0133838 A1 * | 5/2013 | Kim | B32B 37/00 156/707 |
| 2015/0024233 A1 * | 1/2015 | Gunther | G05B 19/41875 428/601 |
| 2016/0001508 A1 * | 1/2016 | Dessel | H04N 1/00827 264/40.1 |

(Continued)

OTHER PUBLICATIONS

Lamers et al., Modelling of fabric draping: Finite elements versus a geometrical method; University of Twente, Department of Mechanical Engineering, Composites Group, PO Box 217, 7500 AE Enschede, the Netherlands; URL: www.composites.wb.utwente.nl; Mar. 4, 2014; (4 pages).

(Continued)

*Primary Examiner* — Nahida Sultana
(74) *Attorney, Agent, or Firm* — Toler Law Group, P.C.

(57) ABSTRACT

A system includes a bladder configured to deform to at least partially surround a draping tool. The bladder has a pattern configured to distort as the bladder deforms. The system also includes an imaging device configured to generate image data of a sequence of images of the pattern of the bladder as the bladder deforms about the draping tool.

20 Claims, 10 Drawing Sheets

(56) References Cited

U.S. PATENT DOCUMENTS

2017/0106607 A1* 4/2017 Anderson ............. B29C 70/342
2018/0044852 A1* 2/2018 Downs ...................... D06P 3/79

OTHER PUBLICATIONS

Larberg, Forming of Stacked Unidirectional Prepreg Materials; Doctoral Thesis; Stockholm, Sweden 2012; KTH Engineering Sciences, (41 pages).

Simon et al., Hot Drape Forming of Thermoset Matrix Composites—Characterisation and Simulation; Proceedings of the International Conference on Flow Processes in Composite Materials, 11-22, Flow processes in composite materials by Advanced Composites Manufacturing Centre, University of Plymouth, 1999 [accessed at http://www.tech.plym.ac.uk/sme/fpcm/FPCM05/FPCM5_Simon.pdf], (11 pages).

Sorrentino et al., Potentiality of Hot Drape Forming to produce complex shape parts in composite material; The International Journal of Advanced Manufacturing Technology; Jul. 2016; vol. 85, Issue 5, (10 pages).

\* cited by examiner

SYSTEM AND METHOD ASSOCIATED WITH DRAPE FORMING

FIELD OF THE DISCLOSURE

The present disclosure is generally related to a system and method associated with drape forming.

BACKGROUND

Drape forming, such as vacuum drape forming or hot drape forming, is a process of making composite parts (e.g., parts made from composite materials). Drape forming is performed by positioning composite materials, such as plies, on a draping tool that has a shape of a composite part to be fabricated. The drape forming process involves deforming a bladder (e.g., an elastic, flexible membrane) about a draping tool (e.g., a die) using vacuum pressure. As the bladder deforms about the draping tool, the bladder exerts force on the composite materials to conform the composite materials to the shape of the draping tool, forming the composite part. In a hot drape forming process, heat is applied to the composite materials as the bladder is applied (e.g., vacuumed down) over the draping tool to increase elasticity of the composite materials.

Depending on the shape of the draping tool, defects may occur as the bladder forces the composite materials into the shape of the draping tool. Inspecting a fabricated component part for defects is expensive and time consuming. Computer modeling or simulation may be used to detect (or predict) certain defects. However, some defects may be difficult to simulate (e.g., may not be predicted) using current computer modeling techniques. Accordingly, designing a part free of defects may take multiple design iterations, increasing overall manufacturing costs.

SUMMARY

In a particular implementation, a system includes a bladder configured to deform to at least partially surround a draping tool. The bladder has a pattern that distorts as the bladder deforms. The system also includes an imaging device configured to generate image data of a sequence of images of the pattern of the bladder as the bladder deforms about the draping tool.

In another particular implementation, a control system includes an interface configured to receive image data from an imaging device. The image data represents a sequence of images of a pattern of a bladder as the bladder deforms to at least partially surround a draping tool. The control system also includes a processor configured to generate surface fixation data based on the image data. The surface fixation data indicates a sequence of surface fixation of regions of the bladder against the draping tool as the bladder deforms about the draping tool. The processor may be further configured to output data indicative of a tension region of the bladder based on the surface fixation data.

In another particular implementation, a method includes determining surface fixation data based on image data. The image data may represent a sequence of images of a pattern of the bladder as the bladder deforms to at least partially surround a draping tool. The surface fixation data indicates a sequence of surface fixation of regions of the bladder against the draping tool as the bladder deforms about the draping tool. The method further includes outputting data indicative of a tension region of the bladder based on the surface fixation data.

DETAILED DESCRIPTION

Implementations disclosed herein enable identification of a compression sequence during drape forming. The compression sequence (which may be indicated by "surface fixation data") may be used to simulate (e.g., computer model) formation of a part (e.g., a composite part) and to identify potential defects in the part. In a particular implementation, a real world simulation (e.g., a test run using a physical part, as compared to a virtual simulation) of a drape forming process may be performed by a drape forming system to obtain the compression sequence to be used to identify potential defects. To illustrate, a patterned bladder may be placed (e.g., draped) over a draping tool. Air between the patterned bladder and the draping tool may be removed by a pump. As the air is removed, the patterned bladder is forced over the draping tool and a pattern (e.g., lines, a set of reference points, etc.) of the patterned bladder becomes distorted. An imaging device may obtain a sequence of images of the pattern as the pattern distorts. A processor may analyze the sequence of images for changes in the pattern and may determine a compression sequence (e.g., surface fixation data indicating a sequence in which regions of the patterned bladder adhere to the draping tool) based on the changes. For example, the processor may determine a strain (or a change in strain) for various regions of the patterned bladder by comparing a first image to a second image of the sequence of images and may determine that a particular region of the bladder is fixed when the strain associated with the particular region of the bladder stops changing.

The compression sequence may be used by a modeling program (e.g., a simulation tool) to simulate (or more accurately simulate) formation of a part. For example, the modeling program may indicate or display zones (e.g., a point, an area, a vertex, an edge, etc.) of the part where defects may form or develop. The shape of the part or the draping tool may be modified (e.g., a dimension or curvature of the part or the draping tool may be modified) to account for or to alleviate the detected defects or potential defects (e.g., a wrinkle, a compression region, a tension region, etc.). The process may be repeated using the modified part or the modified draping tool to confirm that the defects have been alleviated, to identify any new defects, or both. After confirmation that defects have been alleviated and no new defects are introduced, full-scale fabrication of tool(s) may be performed. The full-scale fabrication may involve forming tool(s) that are larger in size than a prototype tool, that are formed using more expensive materials than the prototype tool, or both.

Figure 1:
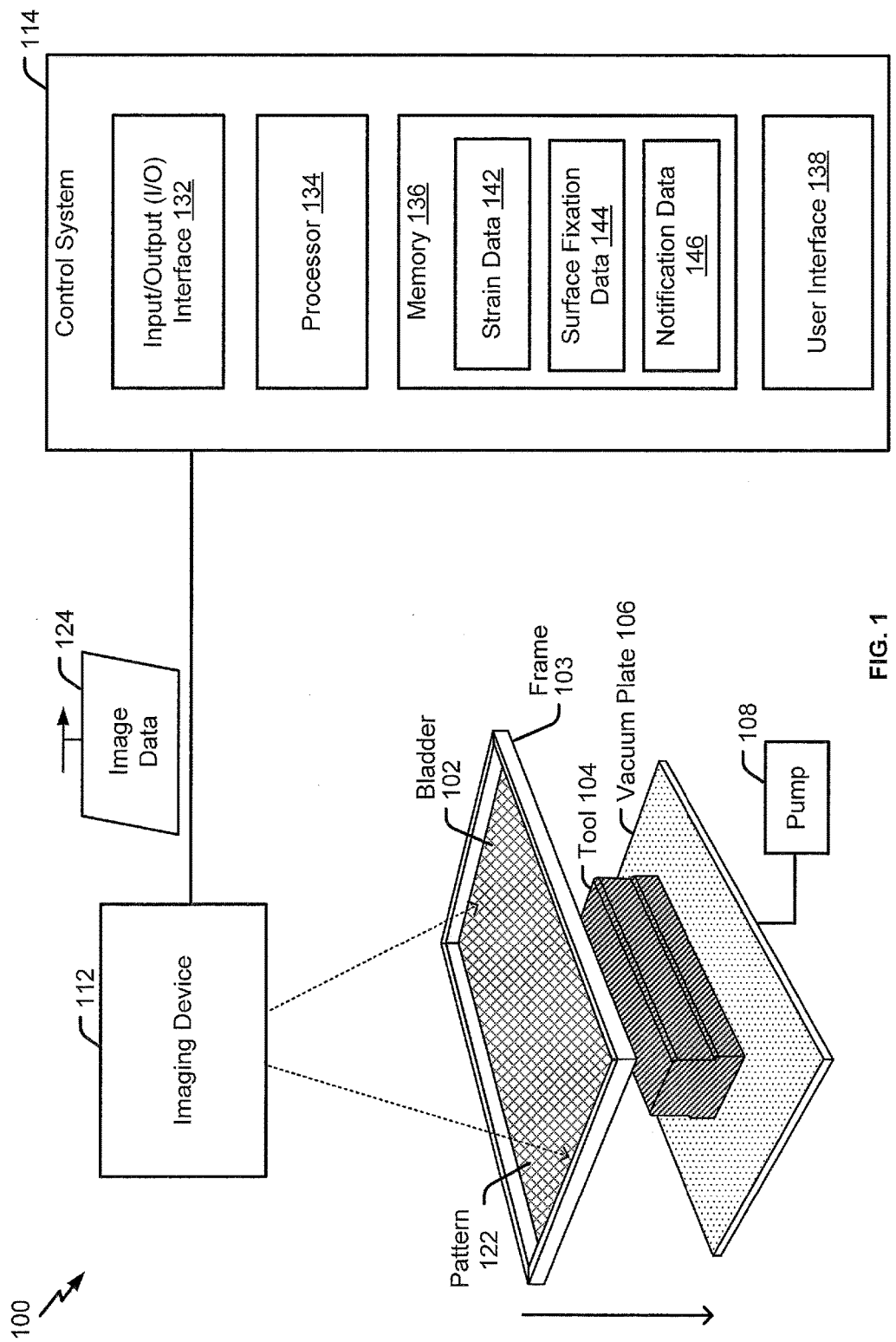
FIG. 1 is a block diagram that illustrates an example of a system for drape forming.

FIG. 1 illustrates an example of a system 100 for drape forming. In the example illustrated in FIG. 1, the system 100 includes a bladder 102 and an imaging device 112. The system 100 further includes a draping tool 104, a vacuum plate 106, a pump 108, and a control system 114. The bladder 102, the draping tool 104, the vacuum plate 106, and the pump 108 may correspond to individual components of drape forming equipment that can be used to form parts (e.g., composite parts that may be included in vehicles, aircraft, machinery, electronic devices, etc.). As further described herein, the system 100 may enable identification of a compression sequence of composite materials used to form a part during drape forming. The compression sequence (which may be indicated by "surface fixation data," as further described herein) may indicate a sequence of surface fixation of regions of the bladder 102 to the draping tool 104. The sequence of surface fixation may correspond to or represent composite materials (e.g., plies) deforming to form a part. For example, the sequence of surface fixation may represent or may be indicative of forces applied to the composite materials to form the part. As an illustrative, non-limiting example, the sequence of surface fixation may be used to generate stress values applied to the composite materials by regions of the bladder 102. In a particular implementation, the system 100 may include a heat generating device and the system 100 may correspond to a hot drape forming system. In alternative implementations, the heat generating device may not be present (e.g., the system 100 may correspond to a "cold" vacuum draping system).

The bladder 102 is configured to deform (e.g., stretch) to at least partially surround the draping tool 104. The bladder 102 may be a compression bladder or a vacuum bladder. The bladder 102 includes a flexible or elastic material. For example, the bladder 102 may include rubber, a polymer, or a combination thereof. A surface of the bladder 102 has a pattern 122 that distorts as the bladder 102 deforms about the draping tool 104. As used herein, and as further described with reference to FIGS. 4 and 5, a bladder may "have" the pattern 122 by virtue of the bladder 102 being formed with the pattern 122 (e.g., rubber of the bladder 102 may be cured into the pattern 122) or by virtue of the pattern 122 having been "applied" to the bladder (e.g., via printing, spray painting, or some other marking method). To illustrate, the bladder 102 includes a first surface and a second surface. The first surface faces the draping tool 104 and the second surface opposes (e.g., is opposite to) the first surface. The pattern 122 may be included on (e.g., printed on, disposed on, embossed on, etc.) the second surface. The pattern 122 may include a plurality of lines, a grid of lines, an array of shapes, or a noise pattern (e.g., a randomly created pattern of reference points). In a particular implementation, the pattern 122 may be included in a reflective coating that is applied to (e.g., brushed on or sprayed on) the second surface of the bladder 102. For example, some imaging devices (e.g., three-dimensional (3D) scanners) are compatible with the reflective coating to determine deformation or strain in a 3D format and the reflective coating may enable the bladder 102 to reflect more (e.g., absorb less) light to an imagining device, resulting in higher resolution images, as compared to bladders without reflective coatings.

In some implementations, the bladder 102 may include a frame 103 or may be attached to the frame 103, as illustrated in FIG. 1. For example, the frame 103 may surround the bladder 102 and may be used to pull the bladder 102 into a taut position or state of tension. The frame 103 is movable relative to the draping tool 104. For example, the frame 103 may be moved or forced in a downward direction towards the vacuum plate 106, as illustrated in FIG. 1. The frame 103 may be coupled to or in contact with the vacuum plate 106 prior to beginning the drape forming process or may come in contact with the vacuum plate 106 during the drape forming process. In some implementations, the bladder 102 is configured to apply a force to composite materials (e.g., plies) as the bladder 102 moves towards the draping tool 104 and is deformed about the draping tool 104. In other implementations, the bladder 102 may not include or be attached to the frame 103. For example, the bladder 102 may be draped over the draping tool 104 and vacuum plate 106, and the bladder 102 may be held in place by the vacuum plate 106 or an external frame placed over the bladder 102.

A part (e.g., a composite part) may be formed by a shape of the draping tool 104 after the bladder 102 is deformed over the draping tool 104. For example, the shape of the draping tool 104 may be similar to a shape of the part and composite materials (e.g., plies) may conform to the shape of the draping tool 104 during deformation of the bladder 102 to form the part. In some implementations, the draping tool 104 may include (or may be formed from) one or more metals. An example of a process of forming a part using a draping tool and a bladder is further described with reference to FIG. 3.

In some implementations, the draping tool 104 may correspond to a prototype draping tool. The prototype draping tool may be formed of materials that are less expensive than materials used to form a draping tool used in production of parts (e.g., a fabrication draping tool). For example, the prototype draping tool may be made of plastic, wood, or composites. Additionally or alternatively, the prototype draping tool may have a smaller scale (e.g., less than actual scale) than a scale of the fabrication draping tool. As an illustrative, non-limiting example, a particular prototype draping tool may be printed by a three-dimensional printer and may be a half scale model of a fabrication draping tool. By utilizing a prototype draping tool, a compression sequence may be identified with less expense as compared to using a fabrication draping tool.

The bladder 102 and the draping tool 104 may be positioned over the vacuum plate 106. The draping tool 104 may be positioned between the bladder 102 and the vacuum plate 106. The vacuum plate 106 may support the draping tool 104 (e.g., the draping tool 104 may be placed on the vacuum plate 106). The vacuum plate 106 may include one or more inlet ports configured to receive a fluid (e.g., air). The vacuum plate 106 may further include one or more outlet ports configured to discharge the fluid.

The pump 108 may be coupled to the vacuum plate 106 via the one or more outlet ports and may be configured to generate vacuum pressure. The vacuum plate 106 and the pump 108 may be configured to remove a fluid (e.g., air) from a space between the bladder 102 and the vacuum plate 106. For example, the pump 108 may remove (or pump) fluid (e.g., air) out of the space between the bladder 102 and the vacuum plate 106. As illustrative, non-limiting examples, the pump 108 may include or correspond to an aspirator, an ejector pump, or a Venturi pump.

The imaging device 112 is positioned proximate to the drape forming equipment. The imaging device 112 may be positioned to obtain data representing the pattern 122 of the bladder 102 as the bladder 102 (and the pattern 122) deforms about the draping tool 104. For example, the imaging device 112 may be positioned above the bladder 102 and facing the pattern 122. The imaging device 112 may be configured to obtain raw data (e.g., light data, intensity data, etc.) representing a sequence of images (e.g., a sequence of still images, frames of video, etc.) as the bladder 102 deforms about the draping tool 104. The imaging device 112 is configured to process the raw data to generate image data 124 corresponding to the sequence of images. The deformation of the pattern 122 in the sequence of images, when compared to the original un-deformed pattern 122 and/or the deformation of the pattern 122 in earlier images, may indicate how the bladder 102 deforms during the vacuuming process. To illustrate, such image comparison may indicate that a certain portion of the bladder 102 deformed more quickly than another portion of the bladder 102, that a certain portion of the bladder 102 stopped deforming (and thus adhered to the draping tool 104) more quickly than another portion of the bladder 102, relative speeds of deformation of different portions of the bladder 102, etc. Thus, the image data 124 may be indicative of strain in or experienced by the bladder 102 during the deformation process.

The imaging device 112 may include or correspond to a 3D image capture system. The imaging device 112 may include multiple capture devices, including a first camera and a second camera that is offset (e.g., at a known distance) from the first camera. To illustrate, the first camera may be directed at the pattern 122 at a first angle that is different from a second angle at which the second camera is directed at the pattern 122. In some implementations, the imagining device 112 may include a 3D scanning device. For example, the 3D scanning device may include a contact 3D scanning device, such as a coordinate measuring machine, or may include a non-contact 3D scanning device, such as a laser scanning device, a structured light device, an x-ray device, or an ultrasound device, as illustrative, non-limiting examples.

The control system 114 is coupled to the imaging device 112 and may receive the image data 124. The control system 114 and the imaging device 112 may correspond to a 3D image correlation system. The control system 114 may include an interface 132 (e.g., an input and/or output interface), a processor 134, a memory 136, and a user interface 138. The interface 132 may include or correspond to a wired interface, a wireless interface, or both. The interface 132 is configured to receive and send data. For example, the interface 132 may be able to receive the image data 124 from the imaging device 112. As another example, the control system 114 may be able to send commands or instructions to drape forming equipment or to output data to another device, as described with reference to FIG. 9.

The control system 114 is configured to determine or calculate strain data 142 based on the image data 124. For example, the processor 134 may process the image data 124 by comparing images of the sequence of images to each other and/or to a previously stored image of the pattern 122 prior to deformation. To illustrate, the processor 134 may compare the pattern 122 in a first image of the sequence of images to the pattern 122 in a second image of the sequence of images to determine a distortion (e.g., a first deviation) of the pattern 122. The processor 134 may determine a deformation based on the distortion of the pattern 122 and may determine the strain data 142 based on the deformation. The strain data 142 may indicate strain at various points or areas of the bladder 102. To illustrate, when the strain data 142 for a portion of the bladder 102 has a non-zero value, the strain data 142 indicates that the portion of the bladder 102 has deformed relative to a previously considered image. Conversely, when the strain data 142 for the portion of the bladder 102 has a zero value, the strain data 142 indicates that the portion of the bladder 102 has not deformed relative to a previously considered image (e.g., and has therefore adhered or fixated to the draping tool 104).

Thus, the control system 114 is configured to generate surface fixation data 144 based on the strain data 142. For example, the processor 134 may determine the surface fixation data 144 by determining an order that each region of the bladder 102 stops deforming based on the image data 124, the strain data 142, or both. To illustrate, the processor 134 may determine, based on comparing images (or strain data determined from the images), that a particular region of the pattern 122 has stopped deforming (e.g., the strain data 142 for that region has a zero value). The surface fixation data 144 may indicate the order in which different regions of the pattern 122 stopped deforming (e.g., the order in which the corresponding strain data 142 for each different region attains zero value).

The memory 136 is coupled to the processor 134 and is configured to store data, such as the strain data 142, the surface fixation data 144, notification data 146, other data, or a combination thereof. The memory 136 may include or correspond to a volatile memory or a non-volatile memory. The processor 134 may be configured to retrieve one or more of notifications indicated by the notification data 146, the surface fixation data 144, or both, as described with reference to FIG. 7. Additionally or alternatively, the processor 134 may be configured to generate one or more notifications based on the notification data 146, as described with reference to FIG. 7.

The processor 134 is configured to identify defect(s) in the drape forming process based on the images data 124, the strain data 142, and/or the surface fixation data 144. For example, the processor 134 may determine that the bladder 102 (or region(s) thereof) are deforming too quickly, deforming too slowly, deforming around a shape that is too pointed or angled, deforming around a shape that is too rounded or curved, deforming too tightly around the draping tool 104, deforming too loosely around the draping tool 104, etc. as compared to operational parameters or limits of the system 100. Such conditions may cause defects, such as wrinkles, compression zones, tension zones, etc. In this case, the processor 134 may generate one or more notifications that indicate at least one possible modification of a component or a variable of the drape forming process that, when implemented, may result in the system 100 complying with operational parameters or limits. The at least one modification may reduce (or eliminate) a defect of a fabricated part, such as wrinkle, a compression zone, a tension zone, or a combination thereof. As illustrative, non-limiting examples, modifications of the component of the drape forming process may include modifying the shape of the draping tool 104, modifying a placement or arrangement of the composite materials, modifying the shape of the part, inserting a draping support adjacent to the draping tool 104, modifying a shape of a draping support, or a combination thereof. The draping supports and adjusting the draping supports are further described with reference to FIG. 8. In some examples, the drape forming process may by modified by adjusting a temperature or a vacuum pressure. To illustrate, an amount of heat applied by a heat generation device (not shown) or an amount of the vacuum pressure generated by the pump 108 may be adjusted or may be varied during the drape forming process.

Figure 7:
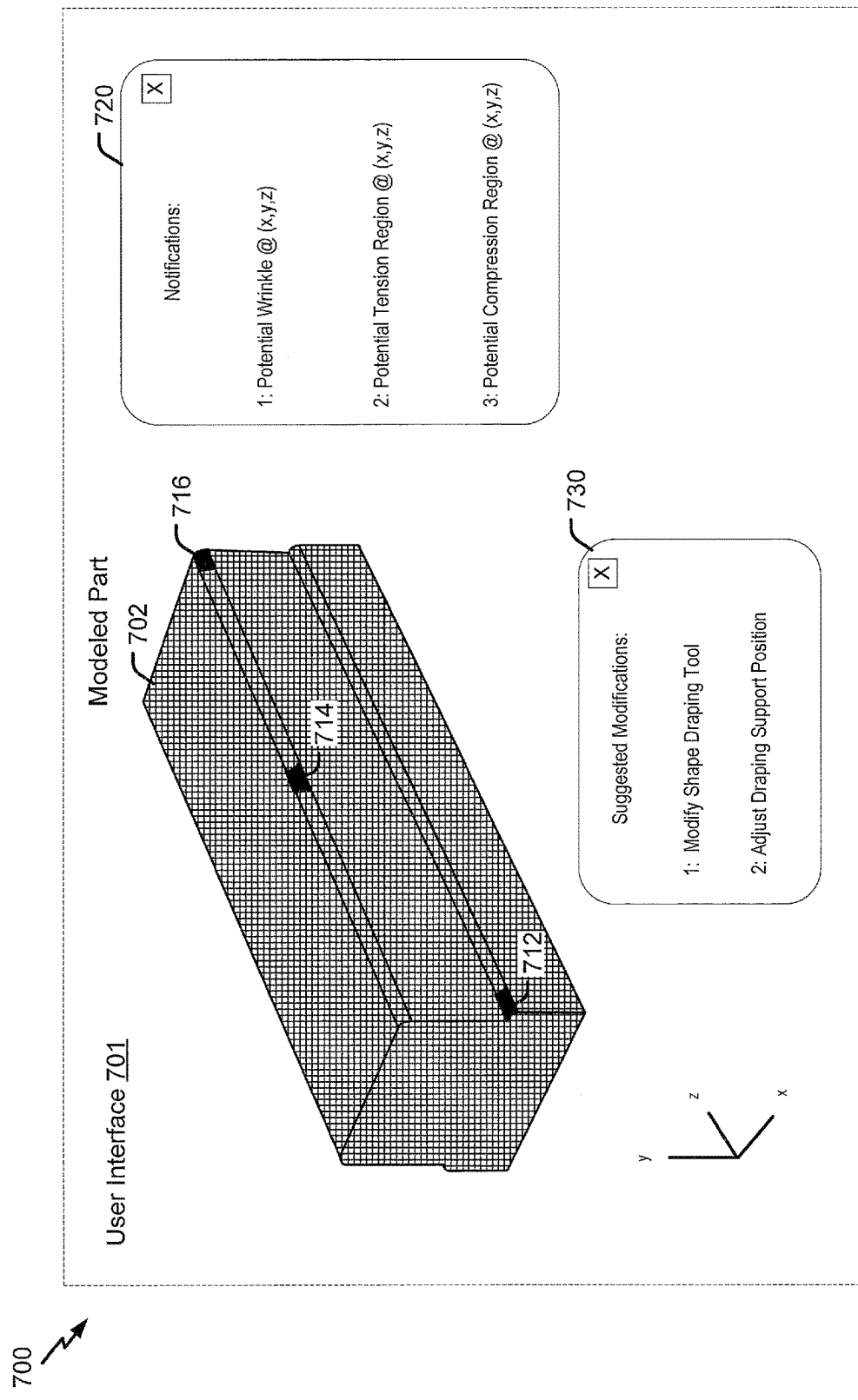
FIG. 7 illustrates an example of a user interface that displays a model of a draping tool.

The user interface 138 may be configured to output the one or more of the notifications. The user interface 138 may include or correspond to a display device, an input device, or a combination thereof. For example, the user interface 138 may include a monitor, a touchscreen, a keyboard, a mouse, etc., as illustrative, non-limiting examples. In some examples, the user interface 138 may visually indicate a location and/or a nature of the detected defect(s) on the draping tool 104 (as illustrated in FIG. 7). In other examples, notifications and/or defects may be indicated via non-graphical methods (e.g., textually and/or audibly).

During operation of the system 100, the bladder 102 is placed (e.g., draped) over the draping tool 104 and the vacuum plate 106. The pump 108 and the imaging device 112 are activated. The pump 108 removes air from between the bladder 102 and the vacuum plate 106. As the air is removed, the bladder 102 is forced towards the draping tool 104 and the vacuum plate 106 by vacuum pressure. The bladder 102 experiences strain and deforms over and about the draping tool 104. Regions of the bladder 102 deform about, and eventually come to rest on, the draping tool 104 in a particular sequence (e.g., the compression sequence). As the bladder 102 deforms, the pattern 122 of the bladder 102 becomes distorted. The imaging device 112 obtains raw data representing a sequence of images that can be compared to determine the distortion (e.g., a series of changes or deviations) of the pattern 122 during the drape forming process. For example, each image of the sequence of images may indicate a particular deviation of the distortion of the pattern 122. The imaging device 112 generates the image data 124 representing the sequence of images and transmits the image data 124 to the control system 114.

The control system 114 processes the image data 124 to generate the strain data 142. To illustrate, the processor 134 may compare the pattern 122 in a first image of the sequence of images to the pattern 122 a second image of the sequence of images. The processor 134 may determine a change in the pattern 122 (e.g., the distortion of the pattern 122) between the first image and the second image. To illustrate, the processor 134 may determine a change in length of a particular area or a region of the bladder 102 based on the change in the pattern 122. The processor 134 may calculate a particular strain value for the particular area or region of the bladder 102 based on the change in length.

The control system 114 determines or generates the surface fixation data 144 based on the strain data 142. For example, the processor 134 determines an order of fixation of regions of the bladder 102 to the draping tool 104 (e.g., the surface fixation data 144) based on order of the regions experiencing no change in strain (e.g., as indicated by a zero strain value). In other implementations, the control system 114 determines the surface fixation data 144 based on the image data 124 and independent of the strain data 142. For example, the processor 134 may utilize a computer vision algorithm to compare the sequence of images and to determine, based on pixel comparisons, when the regions of the bladder 102 stop deforming (e.g., fixate to the draping tool 104). To illustrate, the processor 134 may determine a region has stopped deforming based on the pattern 122 no longer distorting in the region as represented in the image data 124.

The control system 114 or a modeling program (e.g., a simulation tool) simulates (or more accurately simulates) formation of a part based on the strain data 142, the surface fixation data 144, or both. For example, the control system 114 or the modeling program indicates or displays zones (e.g., a point, an area, a vertex, an edge, etc.) of the part having a possibility for anomalies or defects to form or develop by plies (e.g., the composite material) deforming about the draping tool. The zones may be indicated by or determined based on modeling data generated by simulating formation of the part or based on the strain data 142. To illustrate, the modeling data may indicate a zone based on simulating formation of the part, such as by geometric modeling, kinematic modeling, or finite element modeling, as illustrative, non-limiting examples. As another illustration, the strain data 142 may indicate a zone based on a particular strain value associated with the zone exceeding a threshold. In some examples, the shape of the part or the draping tool 104 may be modified to account for or to alleviate the possible anomalies or defects (e.g., a wrinkle, a compression region, a tension region, etc.), as further described with reference to FIG. 8. The process may be repeated using the modified part or the modified draping tool to confirm that the possible anomalies and the defects are alleviated, to identify new anomalies and defects, or both.

In other implementations, the bladder 102 may include a port (e.g., a vacuum port) configured to allow removal of a fluid, such as air. In such implementations, the vacuum plate 106 may not be used and the pump 108 is coupled to the port of the bladder 102.

In some implementations, the composite materials (e.g., the plies) may be placed on the draping tool 104. In such implementations, the compression sequence may be a more accurate representation of a fabrication compression sequence as compared to not determining a compression sequence without using the composite materials.

FIG. 1 thus illustrates a system in which an imaging device obtains images of deformation of a pattern of a bladder as the bladder deforms about a draping tool. The images are used to determine a sequence of surface fixation of regions of the bladder against the draping tool. The sequence of surface fixation is used to model formation of a part to predict defects, such as potential wrinkles, tension zones, or compression zones. By modeling formation of the part based on the sequence of surface fixation a more accurate simulation may be obtained than simulations that are purely virtual and do not involve pattern comparison. Further, the simulation may be performed without requiring a user to manually place plies on the draping tool, which may enable faster testing and production of parts. In addition, more defects may be identified as compared to modeling based on a predicated (rather than empirically determined from image data) sequence of surface fixation. Thus, a greater amount of defects in a part made using the final draping tool may be alleviated (e.g., avoided or prevented). Accordingly, a number of design iterations may be reduced when designing a part and draping tool, parts may have less defects, or both.

Figure 2:
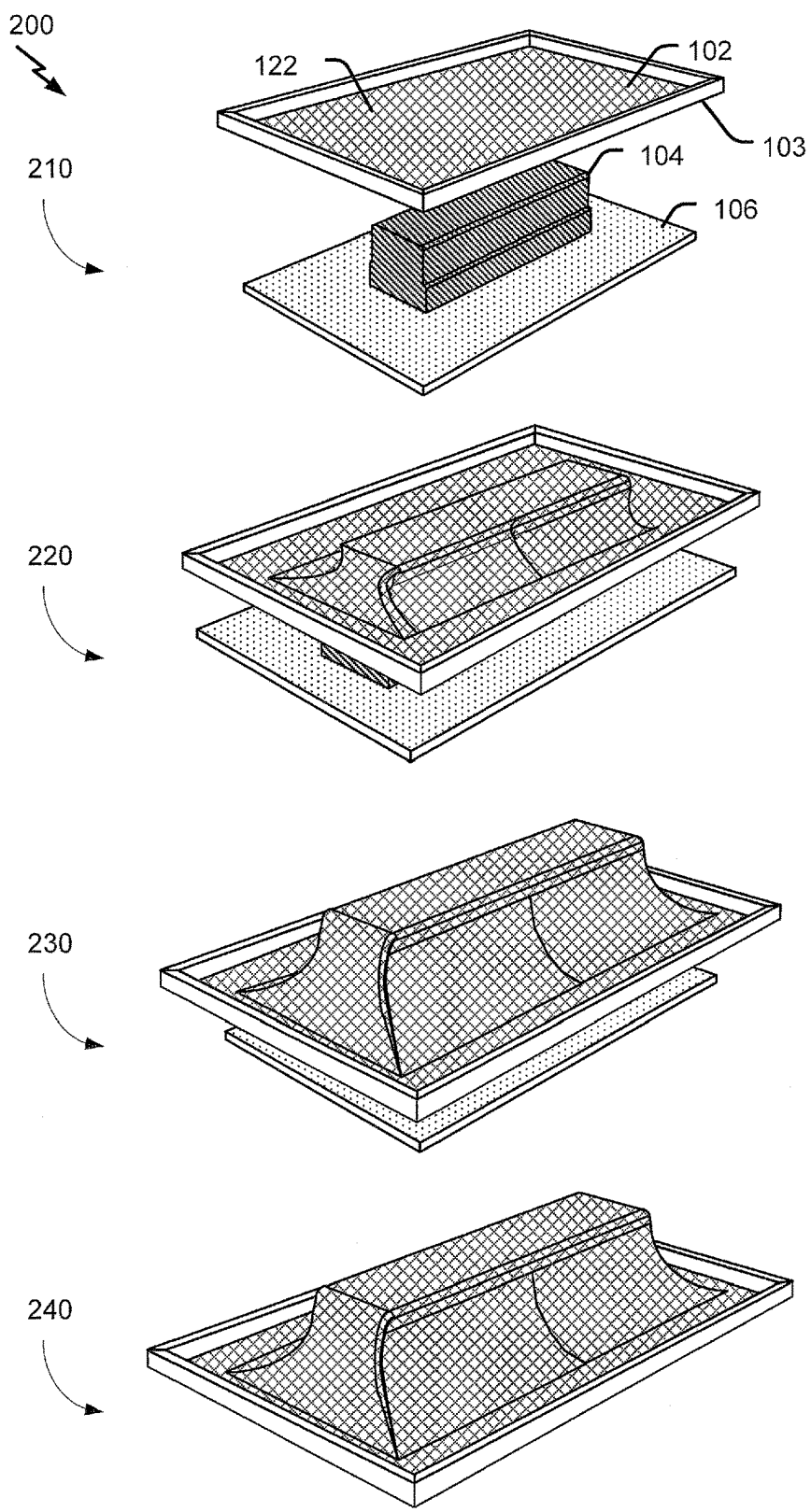
FIG. 2 is a diagram that illustrates deformation of a bladder about a draping tool.

FIG. 2 is a diagram 200 that illustrates stages 210, 220, 230, and 240 of a bladder 102 deforming about a draping tool 104 during a drape forming process. The stages 210-240 depicted in FIG. 2 may correspond to a simulation operation to identify a compression sequence (e.g., a sequence indicated by the surface fixation data 144 of FIG. 1). In a particular implementation, the draping tool 104 may be a prototype tool, as described with reference to FIG. 1.

A first stage 210 of the diagram 200 illustrated in FIG. 2 depicts the drape forming equipment prior to performing the drape forming process. Thus, an image obtained during the first stage 210 depicts the pattern 122 prior to deformation of the bladder 102. A second stage 220 illustrates the bladder 102 beginning to deform about the draping tool 104. For example, air between the bladder 102 and the draping tool 104 begins to be removed, causing the bladder 102 to begin deforming about the draping tool 104. As the bladder 102 deforms, the pattern 122 of the bladder 102 begins to change and becomes distorted. An imaging device, such as the imaging device 112 of FIG. 1, may obtain raw data to generate image data 124 of a sequence of images that represent changes (e.g., deviations) in the pattern 122 of the bladder 102 as the pattern 122 distorts. Although the frame 103 of the bladder 102 is illustrated as being separate from the vacuum plate 106, in other implementations, the frame of the bladder 102 may be coupled to or in contact with the vacuum plate 106 during the drape forming process (e.g., one or more of the stages 220, 230, and 240).

A third stage 230 illustrates the bladder 102 more deformed about the draping tool 104. The air between the bladder 102 and the draping tool 104 continues to be removed and the imaging device 112 continues generating additional image data 124. In a particular implementation, heat may be applied to the bladder 102 from a heat generation device to increase a rate of deformation of the bladder 102. For example, the heat may increase elasticity of the bladder 102.

A fourth stage 240 illustrates the bladder 102 completely deformed about the draping tool 104. The imaging device 112 transmits the sequence of images (e.g., image data) to a control system 114 for analysis. The control system 114 compares image data 124 of each image of the sequence of images to at least one other image in the sequence to identify the compression sequence (e.g., the surface fixation data 144), as described with reference to FIG. 1. The compression sequence may be used by a computer modeling program to indicate defects in a part fabricated by the draping tool 104 and the drape forming process, as described with reference to FIG. 1

Figure 3:
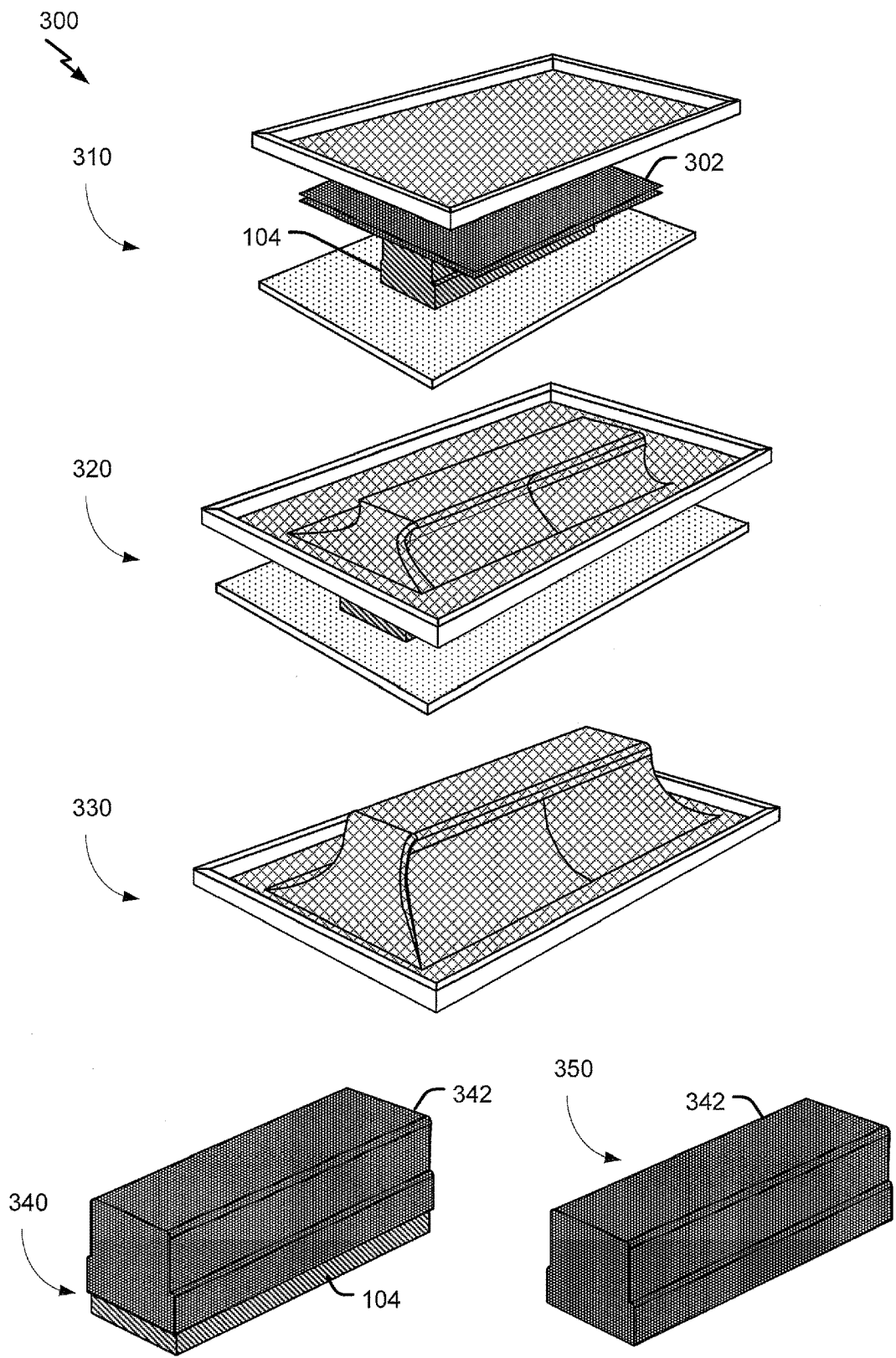
FIG. 3 is a diagram that illustrates formation of a part by drape formation.

Whereas FIG. 2 illustrates a "dry run" in which the bladder 102 deforms (and then "springs back" to its original shape after the pump is turned off), FIG. 3 is a diagram 300 that illustrates stages 310, 320, 330, 340, and 350 of forming a part 342 by deforming composite materials 302 around the draping tool 104. The part 342 may include or correspond to a prototype part or a test part.

A first stage 310 illustrates the drape forming equipment prior to performing the drape forming process. The composite materials 302 may be placed (e.g., arranged) on the draping tool 104 (e.g., a prototype draping tool). The composite materials 302 may include or correspond to plies. In some implementations, the plies may be pre-impregnated with a solvent or a resin to form prepreg plies. Additionally or alternatively, the composite materials 302 may include woven plies, laminated plies, stacks of plies, or a combination thereof. In some implementations, the composite materials 302 may be arranged on the draping tool 104 by hand, such as by a hand layup method. In other implementations, the composite materials 302 may be arranged on the draping tool 104 by an automatic layup method (e.g., arranged by a layup device).

A second stage 320 illustrates the bladder 102 partially deformed about the draping tool 104. Air between the bladder 102 and the composite materials 302 and the draping tool 104 is removed causing the bladder 102 to begin deforming about the composite materials 302 and the draping tool 104, effectively "pushing" the composite materials 302 "down onto" the draping tool 104. As the bladder 102 deforms, the bladder 102 exerts force and pressure on the composite materials 302. The force and pressure begin to conform the composite materials 302 to a shape of the draping tool 104. As described with reference to FIG. 2, an imaging device 112 may generate image data 124 of a sequence of images showing distortion of the pattern (and distortion of the composite materials 302 if the bladder is non-opaque). Additionally, heat may be applied to the bladder 102 and the composite materials 302 from a heat generation device to increase the rate at which the bladder 102 and the composite materials 302 deform. For example, the heat may increase elasticity of the bladder 102, the composite materials 302, or both.

A third stage 330 illustrates the bladder 102 completely deformed about the prototype draping tool. As the bladder 102 fully deforms, the bladder 102 continues to exert force and pressure on the composite materials 302. The force and pressure finish conforming the composite materials 302 to a shape of the draping tool 104 to form the part 342.

A fourth stage 340 illustrates the part 342 formed by the drape forming process, prior to removal of the draping tool 104. The vacuum pressure may be released and the bladder 102 may be removed from the part 342 and the draping tool 104. A fifth stage 350 illustrates the finished part 342 after the draping tool 104 has been removed. As illustrated in FIG. 3, the part 342 has been conformed to the shape of the draping tool 104. To illustrate, the part 342 has a similar shape to the shape of the draping tool 104. As described with reference to FIG. 2, a compression sequence is determined based on the sequence of images. Accordingly, the compression sequence may be used by a computer modeling program to indicate defects in a part fabricated by a fabrication draping tool and the drape forming process. When compared to the "dry run" process of FIG. 2, the process of FIG. 3 may produce a more accurate compression sequence with increased cost (e.g., a cost of the composite materials 302). However, the process of FIG. 3 can be used to validate prior determined compression sequences by forming a physical part 342. Additionally, the process of FIG. 3 can be used to predict defects that may occur in parts produced by mass production of the part 342, even if the part 342 (e.g., a prototype) is free of defects.

Figure 4:
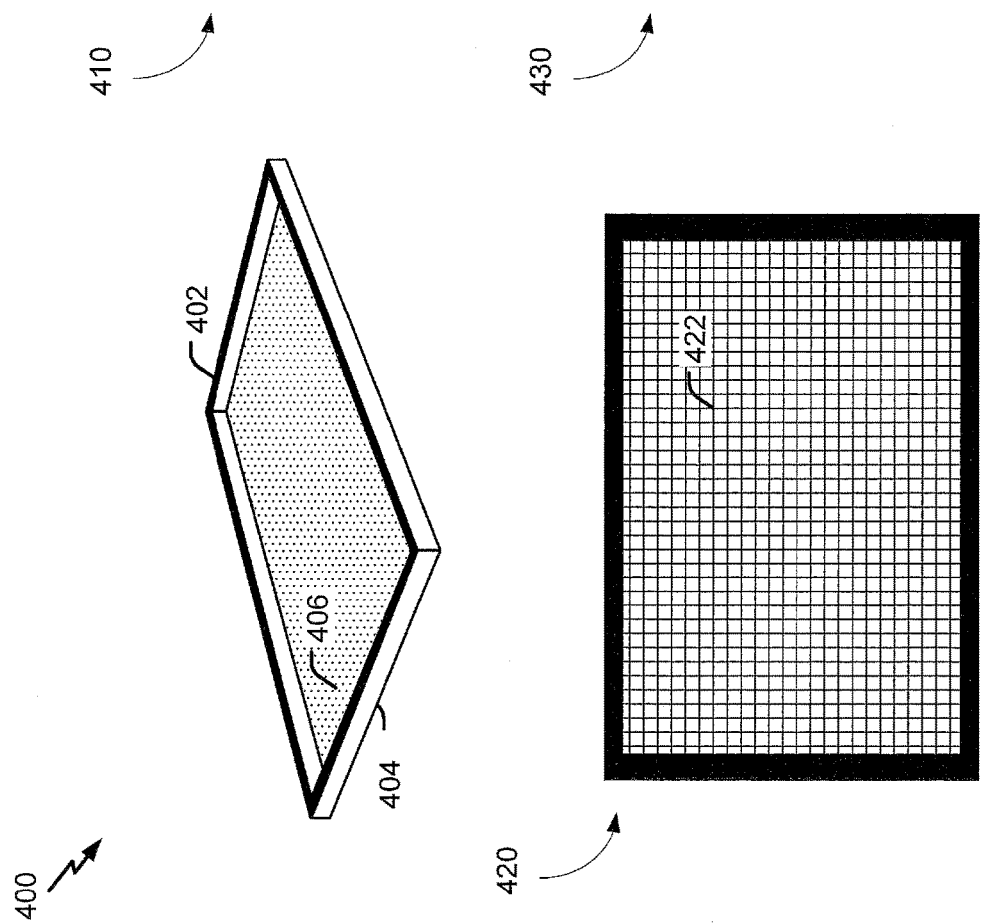
FIG. 4 is a diagram that illustrates example patterns of a bladder.
Figure 4:
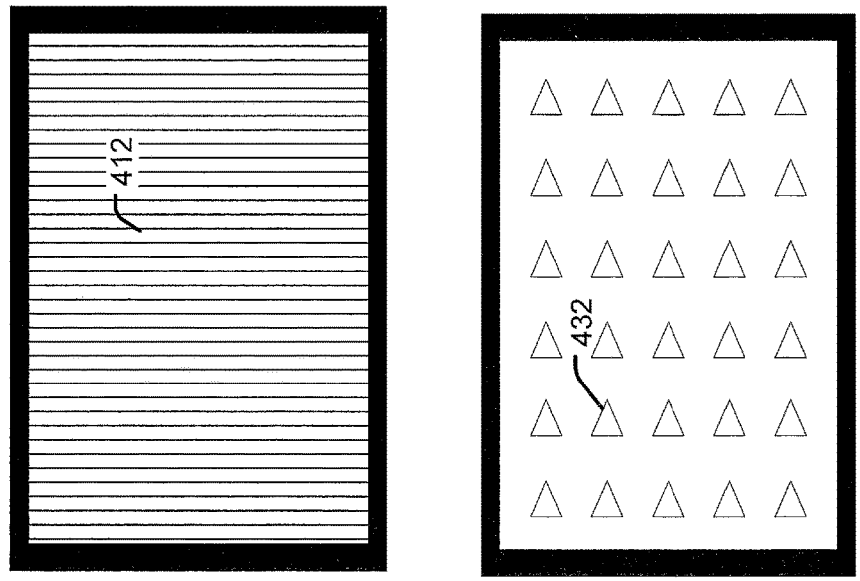

FIG. 4 is a diagram 400 that illustrates example patterns 410, 420, and 430 that may be "included" in or on a bladder 402. The bladder 402 may include or correspond to the bladder 102 of FIG. 1. The bladder 402 may include a first surface 404 and a second surface 406. The second surface 406 may include a pattern, such as the pattern 122 of FIG. 1. The pattern may correspond to a set of reference points that the imaging device 112 and the control system 114 can use to calculate a change in position based on comparing sequential images in a sequence of images.

FIG. 4 illustrates a first pattern 410, a second pattern 420, and a third pattern 430. The first pattern 410 includes a plurality of lines 412. The plurality of lines 412 may be arranged (e.g., oriented) vertically, as shown in FIG. 4. In other implementations, the plurality of lines 412 may be arranged horizontally, diagonally, or concentrically. The plurality of lines 412 may have a uniform spacing or a non-uniform spacing. As the first pattern 410 deforms, a thickness of the plurality of lines 412, a spacing between the plurality of lines 412, and/or relative orientations of the plurality of lines 412 may change, as further described with reference to FIG. 5.

The second pattern 420 includes a plurality of intersecting lines 422. The plurality of intersecting lines 422 may form a grid, as shown in FIG. 4. The plurality of intersecting lines 422 may have a uniform spacing or a non-uniform spacing. Further, rather than being a rectangular grid, the lines 422 may have any orientation between or among the lines 422. As the second pattern 420 deforms, a thickness of the plurality of intersecting lines 422, a spacing between the plurality of intersecting lines 422, relative orientations of the plurality of intersecting lines 422, and/or a size/shape of the "cells" of the grid may change.

The third pattern 430 includes an array of shapes 432. Although FIG. 4 illustrates the third pattern 430 (e.g., the array of shapes 432) including triangular shapes, in other implementations, the array of shapes 432 may be circular (e.g., dots) shapes, rectangular shapes, hexagonal shapes, or other shapes. As the third pattern 430 deforms, a thickness of the outlines of the array of shapes 432, a spacing between the array of shapes 432, relative orientations of the array of shapes 432, and/or a size of a shape 432 may change.

The patterns 410, 420, and 430 may be included on, printed on, marked on, disposed on, or embossed on the second surface 406. As an illustrative, non-limiting example, the plurality of lines 412 of the first pattern 410 may be printed or drawn on the second surface 406. As another example, the array of shapes 432 of the third pattern 430 may be embossed on the second surface 406 during manufacture of the bladder 402.

In some implementations, a pattern may be generated by applying a coating to the second surface 406 of the bladder 402. For example, the coating may generate a stochastic pattern or a noise pattern (e.g., a randomly created "pattern" of reference points). As an illustrative, non-limiting example, the coating may include a first layer of white paint and a second layer of black paint forming speckles (e.g., a randomly created pattern) in the first layer of white paint. In a particular implementation, the coating may be a reflective coating. By including a pattern on the second surface 406 of the bladder 402, an imaging device may be able to determine a change in distance of reference points of the pattern between images. This change in distance of the reference points (and/or a change in length of an area or a region within the pattern) may be used to calculate strain (e.g., strain data), may be used to identify a compression sequence of the bladder 402 (e.g., surface fixation data), or both.

Figure 5:
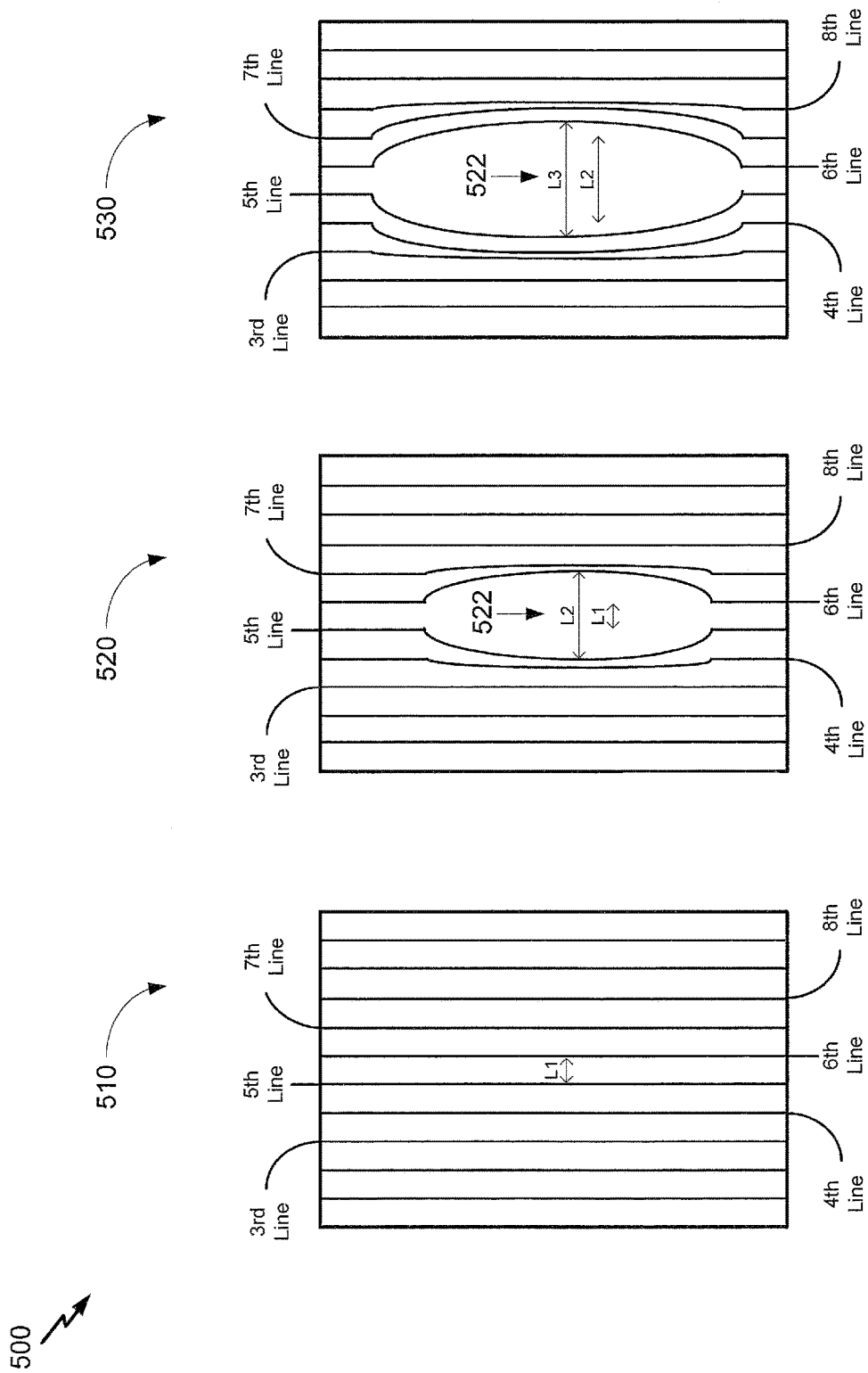
FIG. 5 is a diagram that illustrates an example of deformation of a pattern of a bladder.

FIG. 5 illustrates an example 500 of images depicting deformation of a pattern of a bladder. The bladder may include or correspond to the bladder 102 of FIG. 1 or the bladder 402 of FIG. 4. The pattern may include or correspond to the pattern 122 of FIG. 1 or the patterns 410, 420, 430 of FIG. 4. In the example 500 illustrated in FIG. 5, a first image 510 (e.g., generated by the imaging device 112 of FIG. 1) illustrates the bladder having a pattern that includes a plurality of lines, such as pattern 410 having lines 412. In the example of FIG. 5, the pattern has 10 lines. The first image 510 may correspond to the first stage 210 of FIG. 2 or to the first stage 310 of FIG. 3. The lines of the pattern may be spaced uniformly or non-uniformly. In the example of FIG. 5, the lines are spaced uniformly. A spacing or gap between adjacent lines (e.g., a fifth line and a sixth line of the pattern) has a first length (L1).

A second image 520 illustrates the pattern distorting as the bladder begins to deform (e.g., stretch) about a draping tool. The second image 520 may correspond to the second stage 220 of FIG. 2 or to the second stage 320 of FIG. 3. In the second image 520, a region 522 (e.g., a region between the fifth line and the sixth line) has been deformed (stretched), causing a portion of a fourth line, the fifth line, the sixth line, and a seventh line of the pattern of the bladder to become displaced, distorting the pattern of lines. To illustrate, the portion of the fourth line and the fifth line has been shifted in a first direction (to the left in FIG. 5) and the portion of the sixth line and the seventh line has been shifted in a second direction (to the right in FIG. 5). A strain of the region 522 in the second image 520 may be calculated based on the first length L1 (e.g., an original or previous length) and a second length (L2) of the region 522 after the region 522 has been deformed. For example, the strain may be represented as (or may be proportional to) a change in length (e.g., L2-L1) divided by the first length L1.

A third image 530 illustrates the pattern distorting further as the bladder continues to deform about the draping tool. The third image 530 may correspond to the third stage 230 of FIG. 2 or to the second stage 320 of FIG. 3. In the third image 530, the region 522 has been deformed (stretched) further causing a portion of the third line and the eighth line of the pattern of the bladder to become displaced and causing the portion of a fourth line, the fifth line, the sixth line, and a seventh line of the pattern of the bladder to become further displaced, further distorting the pattern of lines. To illustrate, the portion of the third line has been shifted in the first direction (to the left in FIG. 5) and the portion of the eighth line has been shifted in the second direction (to the right in FIG. 5). Portions of the fourth line and the fifth line have been shifted further in the first direction and portions of the sixth line and the seventh line have been shifted further in the second direction. A strain of the region 522 in the third image 530 may be calculated based on the second length L2 and a third length (L3) of the region 522 after the region 522 has been further deformed. For example, the strain may be represented as (or may be proportional to) a change in length (e.g., L3-L2) divided by the second length L2.

Figure 6:
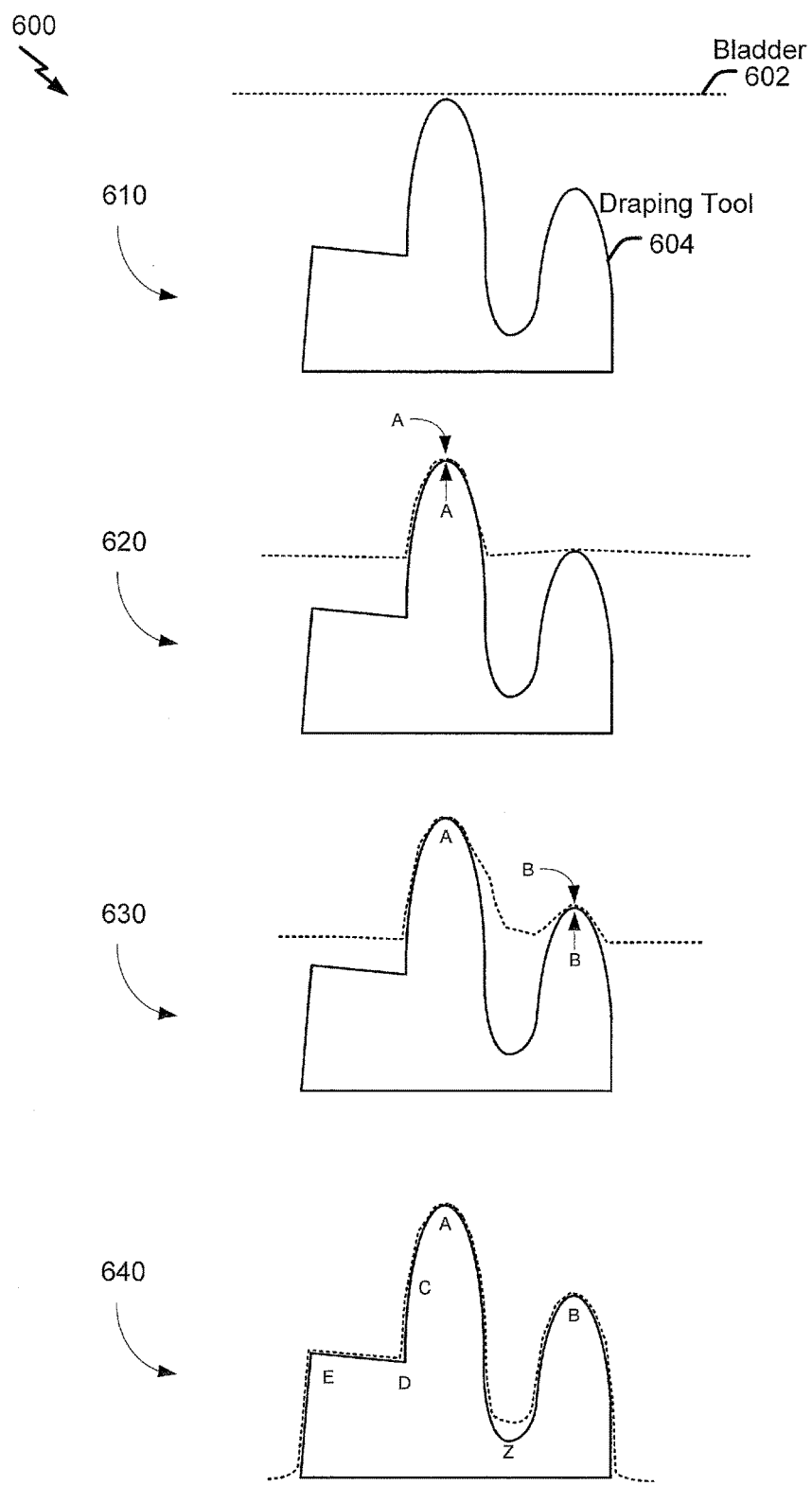
FIG. 6 is a diagram that illustrates an example of identification of a compression sequence.

FIG. 6 is a diagram 600 that illustrates an example of identifying a compression sequence of regions of a bladder 602 fixing against a draping tool 604 during a drape forming process. For example, the drape forming process may be performed by the system 100 of FIG. 1. The bladder 602 may include or may correspond to the bladder 102 of FIG. 1 and the draping tool 604 may include or may correspond to the draping tool 104 of FIG. 1.

FIG. 6 illustrates stages 610, 620, 630, and 640 of the drape forming process, in which the bladder 602 progressively deforms about the draping tool 604. A first stage 610 illustrates the bladder 602 prior to initiating the drape forming process. The first stage 610 may correspond to the first stage 210 of FIG. 2, to the first stage 310 of FIG. 3, or to the first image 510 of FIG. 5.

A second stage 620 illustrates a particular region (e.g., Region A) of the bladder 602 affixing to (e.g., fixing against) the draping tool 604 during the drape forming process. A control system, such as the control system 114 of FIG. 1, may identify that the particular region of the bladder 602 is affixed to the draping tool 604 when the particular region of the bladder 602 stops deforming. As deformation of the bladder 602 is caused by strain and may be visually identified by a change in the pattern of the bladder 602, the control system may identify that the particular region (Region A) is affixed to the draping tool 604 by determining that Region A is no longer experiencing strain (e.g., has a zero strain value) or by determining that the pattern of the bladder 602 in Region A has stopped distorting (e.g., as determined using pixel comparisons between images).

A third stage 630 illustrates another region (e.g., Region B) of the bladder 602 affixing to the draping tool 604 during the drape forming process. The control system may identify that Region B is affixed to the draping tool 604 by determining that Region B is no longer experiencing strain or by determining that the pattern of the bladder 602 in Region B has stopped distorting.

A fourth stage 640 illustrates the compression sequence of multiple regions (e.g., Regions A, B, C, D, E, and Z) of the bladder 602 forming against the draping tool 604 during the drape forming process. Table 1 below represents surface fixation data corresponding to the sequence in which the regions A-Z fixated or adhered to the draping tool 604.

TABLE 1

| Sequence Number | Region | Time of Fixation/Adhesion (seconds after start) |
|---|---|---|
| 1 | A | 10 |
| 2 | B | 97 |
| 3 | C | 266 |
| 4 | D | 375 |
| 5 | E | 489 |
| n | Z | 1000 |

The compression sequence (e.g., a sequence represented by the surface fixation data in Table 1) may be used to identify potential defects in a part that is fabricated by the draping tool 604. For example, the control system may identify potential defects in the part by comparing calculated strain values to a threshold. To illustrate, when one or more strain values for a region of the bladder 602 are greater than or equal to a threshold, the control system may indicate a potential defect in the fabricated part corresponding to the region of the bladder 602. Additionally or alternatively, the compression sequence (or the surface fixation data) may be sent to another computing device that is configured to execute a modeling program (e.g., a simulation tool). The modeling program may simulate the drape forming process based on the compression sequence and may output one or more notifications (e.g., a potential defect, a suggested modification, or both). In some examples, the modeling program may also simulate the drape forming process based on potential modifications to the surface fixation data. To illustrate, when a particular defect is identified, one or more candidate "fixes" may be modeled (e.g., iteratively), until a particular candidate fix results in the defect being alleviated. Examples of modeling, identifying candidate fixes, and modifying draping parameters are further described with reference to FIGS. 7-9.

FIG. 7 is a diagram 700 that illustrates an example of a user interface 701, such as a graphical user interface (GUI), that may be generated and/or displayed by a control system (e.g., the control system 114 of FIG. 1) or by another computing device coupled to the control system. The user interface 701 may include or correspond to the user interface 138 of FIG. 1. The user interface 701 may be displayed on a display device. In some examples, the user interface 701 may be interactive and may be responsive to input received via an input device. In a particular example, the input device is included in the display device, such as a touch screen.

The user interface 701 may include data, such as output data, notification data, modification data, model data, or a combination thereof. The output data may include or correspond to strain data, surface fixation data, or both, such as the strain data 142 and the surface fixation data 144 of FIG. 1. The notification data may include one or more visual notifications, text notifications, or both. The notification data may include or correspond to the notification data 146 of FIG. 1. The modification data may include or correspond to suggested modifications that correspond to the one or more notifications. In a particular implementation, the modification data may include or correspond to the notification data 146 of FIG. 1. The model data may include or correspond to a computer generated model of a bladder, a part, or a draping tool. The model data may be generated or adjusted by a modeling program (e.g., a simulation tool).

In the example of FIG. 7, the user interface 701 includes a visual representation of a modeled part 702. The modeled part 702 may be produced by a modeling program and may include indications (e.g., visual indications) of potential defects 712, 714, and 716. In FIG. 7, the modeled part 702 includes a first potential defect 712 (e.g., a potential wrinkle), a second potential defect 714 (e.g., a potential tension region), and a third potential defect 716 (e.g., a potential compression region). As shown in FIG. 7, the potential defects 712-716 may be highlighted or otherwise visually indicated on the modeled part 702 to illustrate where on the modeled part 702 the defects may potentially occur. The user interface 701 may display one or more notifications 720 that correspond to the potential defects 712, 714, and 716, as shown.

Additionally or alternatively, the user interface 701 may include one or more modifications 730 based on the notifications 720. In FIG. 7, the user interface 701 indicates a first modification to modify a shape of a draping tool and a second modification to adjust a draping support position. In some implementations, the one or more modifications 730 may correspond to suggestions generated by a processor based on the notification data 146 of FIG. 1, by a modeling program, or both. To illustrate, the suggested modifications to modify a shape of a draping tool and to adjust a draping support position may be generated because a potential wrinkle, a potential tension region, and a potential compression region have been identified. In some examples, specific modifications may be indicated as being suggested to alleviate specific potential defects.

In other implementations, the user interface 701 may display a visual representation of a bladder deformed about a draping tool. In such implementations, the user interface 701 may be displayed at a display device coupled to a control system, such as the control system 114 of FIG. 1. The visual representation of the bladder deformed about the draping tool may be generated based on the image data 124 of FIG. 1. The visual representation of the bladder may include one or more defects. For example, one or more regions of the bladder may be indicated by the user interface 701 as experiencing a strain that may have a potential to cause a defect. In a particular implementation, the visual representation of the bladder may indicate strain at various regions of the bladder at different times and may be generated based on the strain data.

Figure 8:
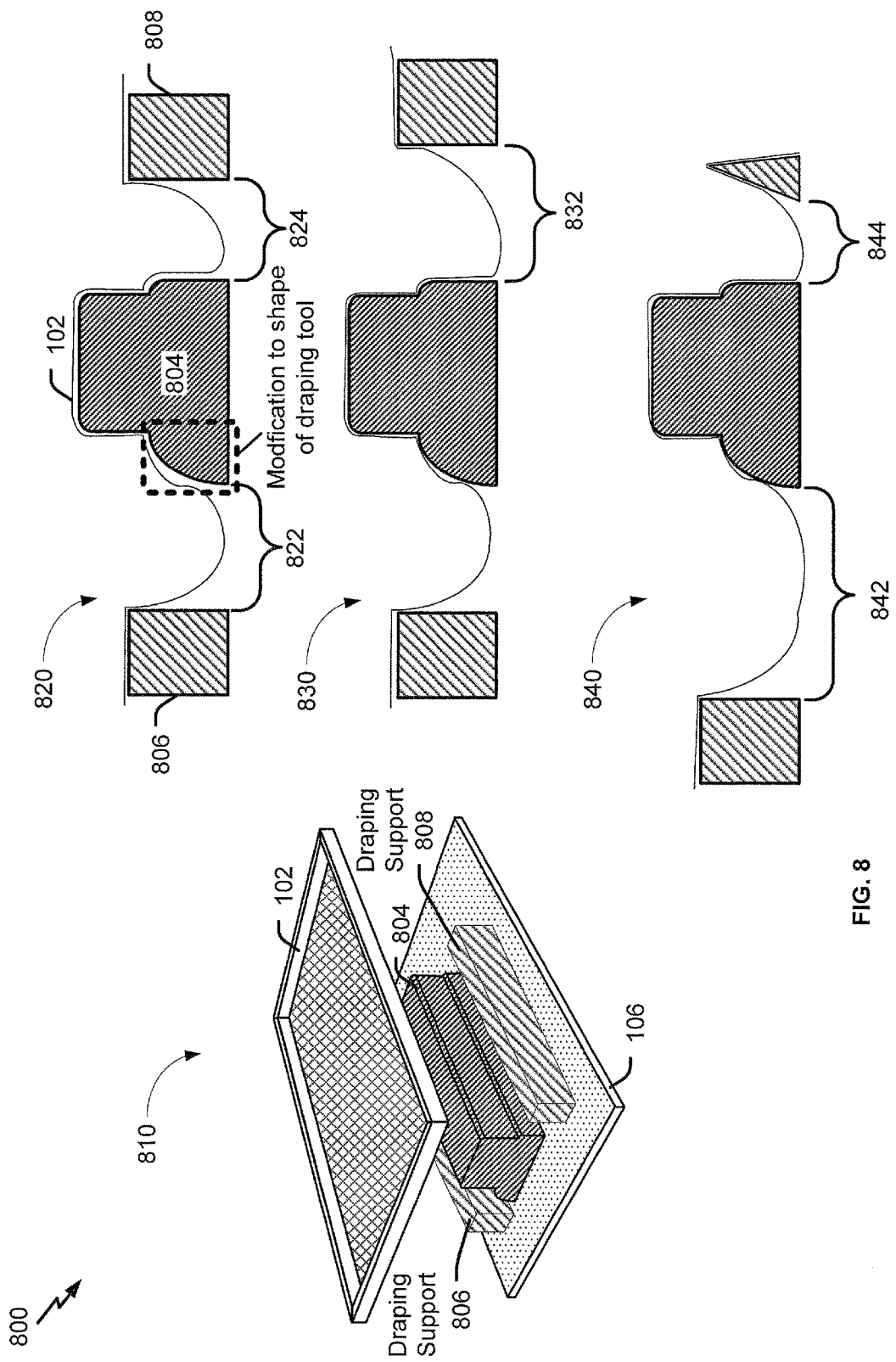
FIG. 8 is diagram that illustrates examples of draping supports and adjustments to the draping supports.

FIG. 8 is a diagram 800 that illustrates draping supports 806, 808 of a drape forming system 810, adjustment of the draping supports 806, 808, and utilization of a modified draping tool 804. The drape forming system 810 may include or correspond to the system 100 of FIG. 1. For example, the drape forming system 810 includes the bladder 102 (including the pattern 122) and the vacuum plate 106.

The draping supports 806, 808 may be placed on the vacuum plate 106 and adjacent to the modified draping tool 804. The draping supports 806, 808 may be configured to adjust or modify the deformation of the bladder 102. For example, the draping supports may delay or reduce deformation and surface fixation of one or more regions the bladder 102. Accordingly, a shape of the draping supports 806, 808 or a placement of the draping supports 806, 808 relative to the draping tool 804 may be adjusted to reduce defects. In addition, the modified draping tool 804 has a modified shape relative to the draping tool 104 of FIG. 1. In some examples, the draping supports 806, 808 may be automatically placed on the vacuum plate 106, and/or the shape of the draping tool 104 may be modified to generate the modified draping tool 804, responsive to the control system 114 identifying one or more potential defects during a previous test run of deforming the bladder 102 (and/or composite materials 302 of FIG. 3) over the draping tool 104 of FIG. 1.

FIG. 8 illustrates diagrams 820, 830, and 840 of the drape forming system 810 during a drape forming process where the bladder 102 deforms about the modified draping tool 804. A first diagram 820 illustrates the bladder 102 deformed about the modified draping tool 804 and the draping supports 806, 808 after completion of the drape forming process. As illustrated in the first diagram 820, the draping supports 806, 808 have a rectangular shape, a first draping support 806 may be placed a first distance 822 from the draping tool 804, and a second draping support 808 may be placed a second distance 824 from the draping tool 804.

A second diagram 830 illustrates the bladder 102 deformed about the modified draping tool 804 and the draping supports 806, 808 where the position of the second draping support 808 has been adjusted relative to the first diagram 820. The second draping support 808 may be placed at a third distance 832 from the modified draping tool 804 (e.g., farther away from the modified draping tool 804 as compared to the first diagram 820). The adjustment of the position of the second draping support 808 may alter the deformation of the bladder 102 (e.g., the bladder 102 may more evenly and more closely affix to the draping tool 804). In some examples the position of the second draping support 808 may have been automatically adjusted in response to detecting a potential defect when the second draping support 808 is placed at the second distance 824 from the modified draping tool 804.

A third diagram 840 illustrates the bladder 102 deformed about the modified draping tool 804 and the draping supports 806, 808 where the position of both draping supports 806, 808 have been adjusted relative to the first diagram 820 and a shape of the second draping support 808 has been adjusted relative to the first diagram 820. As illustrated in the third diagram 840, the second draping support 808 has an adjusted shape (e.g., a triangular shape instead of a rectangular shape). The first draping support 806 may be placed at a fourth distance 842 from the modified draping tool 804 (e.g., farther away from the modified draping tool 804 than in the first diagram 820) and the second draping support 808 may be placed at a fifth distance 844 from the modified draping tool 804 (e.g., closer to the modified draping tool 804 than in the first diagram 820). The adjustment to the shape and placement of the draping supports 806, 808 may alter the deformation of the bladder 102 (e.g., the bladder 102 may more evenly and more closely affix to the draping tool 804). In some examples the positions of the draping supports 806, 808 and/or the shape of the second draping support 808 may be automatically adjusted in response to detecting a potential defect caused by the arrangement in the first diagram 820 or in the second diagram 830.

FIG. 8 thus illustrates an iterative process of adjusting parameters of the draping process until identified potential defects are alleviated and no new defects are found. To illustrate, when the arrangement shown in the third diagram 840 does not lead to identifying a potential defect, a full-scale formation of a part may be performed using one rectangular draping support, one triangular draping support, a modified draping tool, and the distances 842, 844 between the draping supports 806, 808 and the modified draping tool 804.

Figure 9:
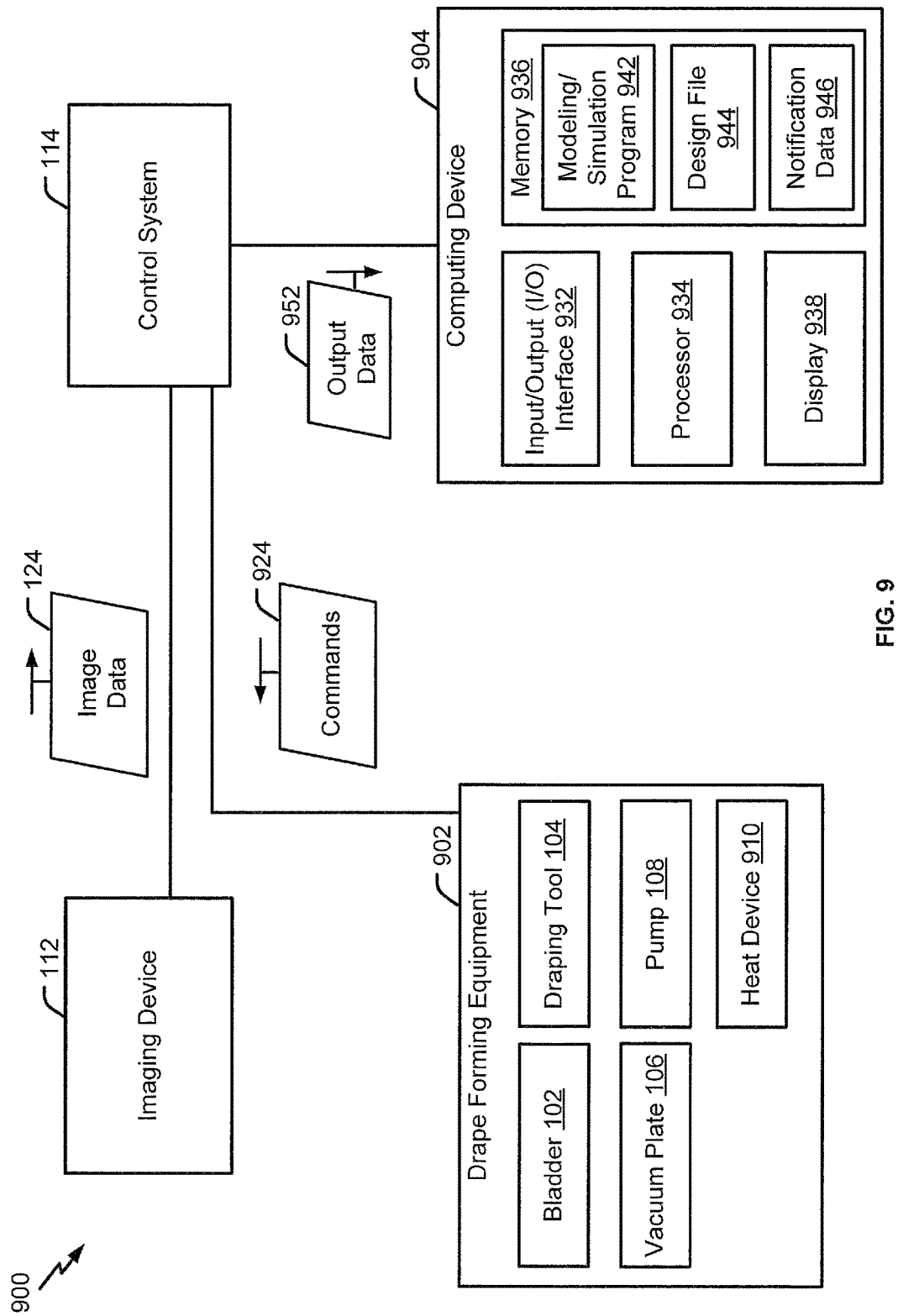
FIG. 9 is a block diagram of an illustrative implementation of a system for drape forming.

FIG. 9 is a diagram that illustrates a system 900 for drape forming. The system 900 may include or correspond to the system 100 of FIG. 1. The system 900 includes drape forming equipment 902, an imaging device 112, a control system 114, and a computing device 904.

The drape forming equipment 902 includes the bladder 102 (including the pattern 122), the draping tool 104, the vacuum plate 106, and the pump 108, as described with reference to FIG. 1. The drape forming equipment 902 may further include a heat generation device 910 configured to generate and apply heat to the bladder 102, composite materials (e.g., the composite materials 302 of FIG. 3), or both, during a drape forming process. The imaging device 112 is positioned to generate a sequence of images of a pattern 122 of the bladder 102 as the pattern 122 distorts during deformation of the bladder 102 about the draping tool 104. The imaging device 112 generates image data 124 corresponding to the sequence of images. The imaging device 112 may send the image data 124 to the control system 114, as shown.

The control system 114 determines strain data, surface fixation data, or both based on the image data 124, as described with reference to FIG. 1. For example, the control system 114 may determine the strain data based on the image data 124 and may determine the surface fixation data based on the image data 124 and the strain data, as described with reference to FIGS. 1, 5, and 6. As another example, the control system 114 may determine the surface fixation data based on the image data 124, as described with reference to FIGS. 1, 5, and 6. The strain data and the surface fixation data may include or correspond to the strain data 142 and the surface fixation data 144 of FIG. 1.

The control system 114 generates and transmits output data 952 to the computing device 904. The output data 952 may include the image data 124, the strain data, the surface fixation data, the notification data, (e.g., the notification data 146), or a combination thereof. In a particular example, the output data 952 may include or may be used to generate the user interface 701 of FIG. 7.

The computing device 904 may include an input/output interface 932, a processor 934, a memory 936, and a display 938. The computing device 904 may receive the output data 952 from the control system 114 via the I/O interface 932. The memory 936 may be coupled to the processor 934 and may be configured to store data. For example, the memory 936 may store a modeling or simulation program 942, a design file 944, notification data 946. The modeling or simulation program 942 may include or correspond to a geometric modeling tool, a kinematic modeling tool, a finite element modeling tool, as illustrative, non-limiting examples. In some implementations, the memory 936 may store the output data 952 (or a portion thereof) received from the control system.

The processor 934 may be configured generate one or more notifications, modifications, or both, as described with reference to FIGS. 1 and 7. The processor 934 may be configured to execute and run the modeling or simulation program 942. For example, the processor 934 may simulate formation of a part fabricated by the drape forming equipment 902. The processor 934 may generate models of the part fabricated by the drape forming equipment 902, models of the draping tool 104, or both. The processor 934 may automatically initiate one or more adjustments to the models of the part or the draping tool 104. The processor 934 may generate or update the design file 944 based on the adjustments to the models of the part or the draping tool 104.

In other implementations, the drape forming equipment 902 may include a controller. In such implementations, the controller may generate and send the commands 924 to the components of the drape forming equipment 902 to control, adjust, or both the drape forming process.

In some examples, the control system 114 may send commands 924 to one or more components of the drape forming equipment to control and/or adjust the drape forming process. For example, the control system 114 may send a command to the pump 108 to increase an amount of vacuum pressure generated by the pump 108. As another example, the control system 114 may send commands to place draping supports on the vacuum plate 106, to remove draping supports from the vacuum plate 106, to change a shape of a draping support, to change a distance between a draping support and the draping tool 104, to change the shape of the draping tool 104 (or to replace the draping tool with a modified draping tool, such as the modified draping tool 804 of FIG. 8), etc. The commands 924 may be automatically generated by the control system 114, may be automatically generated by the computing device 904, may be generated based at least in part on user input received at the computing device 904 (e.g., responsive to the user interface 701 of FIG. 7), etc.

FIG. 9 thus illustrates an example of an automatic, feedback driven system 900 in which image data is used to identify potential defects in a draping process, a modeling program is used to iteratively model changes to the draping process until the potential defects are alleviated, and in which commands are automatically communicated to the drape forming equipment to implement the changes. The system 900 of FIG. 9 may thus improve the draping process and the functioning of the drape forming equipment.

Figure 10:
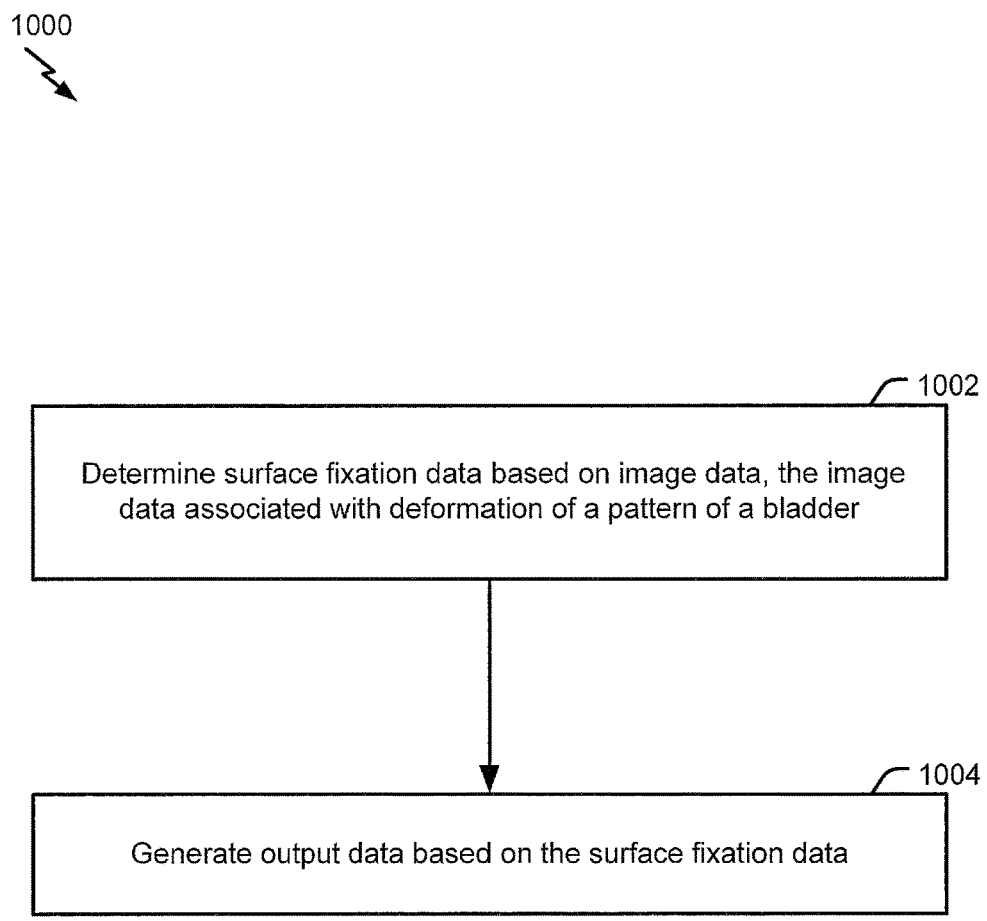
FIG. 10 is a flow chart of an example of a method of identifying a compression sequence during drape forming.

FIG. 10 illustrates a particular example of a method 1000. The method 1000 may be performed by the system 100 of FIG. 1, the system 900 of FIG. 9, or a combination thereof. The method 1000 may include or correspond to a method for identifying a compression sequence of a bladder during drape forming.

The method 1000 includes, at 1002, determining surface fixation data based on image data, the image data associated with deformation of a pattern of a bladder. In some implementations, the image data represents a sequence of images of a pattern of the bladder as the bladder deforms to at least partially surround a draping tool. In a particular implementation, the surface fixation data indicates a sequence of surface fixation of the bladder against the draping tool as the bladder deforms about the draping tool. For example, the bladder may include or correspond to the bladder of 102 of FIGS. 1, 2, 8, and 9, the bladder 402 of FIG. 4, or the bladder 602 of FIG. 6. The image data may include or correspond to the image data 124 of FIGS. 1 and 9. The pattern may include or correspond to the pattern 122 of FIG. 1 or one of the patterns 410, 420, 430 of FIG. 4. The draping tool may include or correspond to the draping tool 104 of FIGS. 1 and 9, the draping tool 604 of FIG. 6, or the draping tool 804 of FIG. 8.

To illustrate, referring to FIG. 1, the imaging device 112 may generate a sequence of images (generate the image data 124) of the pattern 122 of the bladder 102 as the bladder 102 deforms about the draping tool 104. The control system 114 may determine the surface fixation data 144 based on the image data 124. For example, the processor 134 may compare a first image to a second image of the sequence of images to determine when the pattern 122 stops distorting to determine the surface fixation data 144. As another illustration, referring to FIG. 1, the control system 114 may determine the surface fixation data 144 based on the strain data 142. For example, the processor 134 may determine the surface fixation data 144 based on the strain data 142 indicating no change in strain for the various regions of the bladder 102.

The method 1000 includes, at 1004, generating output data based on the surface fixation data. For example, the output data may include or correspond to the notification data 146 of FIG. 1, the notifications 720 of FIG. 7, the modifications 730 of FIG. 7, the notification data 946 of FIG. 9, the output data 952 of FIG. 9, or a combination thereof. To illustrate, referring to FIG. 9, the control system 114 may generate the output data 952 and send the output data to the computing device 904. As another illustration, referring to FIG. 9, the computing device 904 may generate a notification or a modification based on the output data 952. In a particular implementation, the output data is indicative of a tension region of the bladder. The tension region may indicate a potential wrinkle, a potential tension zone, a potential compression zone, or a combination thereof, in a part formed by the draping tool.

In some implementations, the method 1000 may further include applying a coating to a surface of the bladder. The coating may include or form the pattern on the surface of the bladder. In a particular example, the coating may form a noise pattern on the surface of the bladder, such as a stochastic pattern or a randomly generated set of reference points. The method 1000 may also include receiving the image data from one or more imaging devices. The one or more imaging devices may capture a plurality of images of the bladder during deformation of the bladder about the draping tool. The one or more imaging devices may include or correspond to the imaging device 112 of FIGS. 1 and 9. The plurality of images may include or correspond to the sequence of images and the image data 124.

In some implementations, the method 1000 may further include simulating formation of a part based on the output data to generate a simulated part. For example, referring to FIG. 9, the computing device 904 may execute the modeling or simulation program 942 and may generate the simulated part based on the design file 944. The method 1000 may also include generating a notification indicating a modification of a component or a variable of a drape forming process based on the simulated part. The notification and the modification may include or correspond to the notifications 720 of FIG. 7 and the modifications 730 of FIG. 7, respectively. In a particular implementation, the method 1000 may include modifying a shape of the draping tool, inserting a draping support adjacent to the draping tool, modifying a shape of a draping support, or a combination thereof, based on the output data. For example, the computing device 904 may modify the design file 944 to modify the shape of the part or the draping tool. In a particular implementation, the method 1000 may include modifying a temperature or a vacuum pressure of a drape forming process based on the output data. For example, the control system 114 may send the commands 924 to the drape forming equipment to adjust a temperature setting of the heat generation device 910 or a vacuum pressure setting of the pump 108.

In some implementations, the method 1000 may include comparing first positions of a set of reference points of the pattern in a first image of the sequence of images to second positions of the set of reference points of the pattern in a second image of the sequence of images to determine a distortion of the pattern. The method 1000 may also include determining a deformation based on the distortion of the pattern. The method 1000 may further include determining a strain based on the deformation. In a particular implementation, determining the sequence of surface fixation includes, for each of a plurality of regions of the bladder, determining an order that the plurality of regions stop deforming (e.g., fixate to the draping tool) based on the image data.

In some implementations, the method 1000 may include generating a notification that indicates at least one possible modification of a component or a variable of a drape forming process based on the output data For example, the notification may be retrieved from the notification data stored in the memory based on the output data, modeling data, or both. The notification may be output by a display device or a user interface. The user interface may include or correspond to the user interface 138 of FIG. 1. The display device may include or correspond to the display 938 of FIG. 9. The notification may identify a modification to the component or to the variable of the drape forming process to reduce a wrinkle, a compression zone, a tension zone, or a combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system comprising:
    a memory configured to store image data of a bladder configured to deform to at least partially surround a draping tool, the bladder having a pattern configured to distort as the bladder deforms wherein the image data includes a sequence of images of the pattern of the bladder as the bladder deforms about the draping tool; and
    a processor configured to receive the image data and to detect, based on distortion of the pattern indicated by the sequence of images, a characteristic associated with formation of a part using the draping tool and the bladder.

2. The system of claim 1, wherein the bladder includes a first surface facing the draping tool and a second surface opposite the first surface, wherein the second surface has the pattern, and wherein the pattern includes a plurality of lines, a grid of lines, an array of shapes, or a noise pattern.

3. The system of claim 2, wherein the pattern is included in or formed by a coating applied to the second surface of the bladder.

4. The system of claim 1, further comprising:
    a plate supporting the draping tool; and
    a pump coupled to the plate and configured to generate vacuum pressure to deform the bladder about the draping tool.

5. The system of claim 1, further comprising one or more draping supports configured to modify the deformation of the bladder about the draping tool.

6. The system of claim 1, further comprising:
    one or more plies disposed on the draping tool, wherein the one or more plies are configured to, responsive to movement of the bladder, deform about the draping tool to form a part; and
    a heat generation device configured to apply heat to the bladder, to the one or more plies, or to both.

7. The system of claim 1, wherein the processor is further configured to generate strain data indicative of a strain in the bladder based on the image data.

8. The system of claim 7, wherein the processor is further configured to generate surface fixation data based on the strain data, the image data, or both, and wherein the surface fixation data indicates a sequence of surface fixation of regions of the bladder against the draping tool as the bladder deforms about the draping tool.

9. The system of claim 8, wherein the processor is further configured to determine, based on the surface fixation data, at least one modification to the draping tool, to a draping support, or to a variable of a drape forming process.

10. The system of claim 1, wherein the characteristic indicates a potential wrinkle in the part, a potential tension zone of the part, a potential compression zone of the part, or a combination thereof.

11. The system of claim 1, wherein the processor is further configured to generate, based on the characteristic, a notification that indicates a modification of the part, a modification of a drape forming process associated with the part, or a combination thereof.

12. The system of claim 11, further comprising a display device configured to present a graphical user interface (GUI) that indicates the notification.

13. A method comprising:
    receiving, at a processor and from a memory, image data of a bladder that deforms to at least partially surround a draping tool, the bladder having a pattern that distorts as the bladder deforms wherein the image data includes a sequence of images of the pattern of the bladder as the bladder deforms about the draping tool; and
    detecting, by the processor and based on distortion of the pattern indicated by the sequence of images, a characteristic associated with formation of a part using the draping tool and the bladder.

14. The method of claim 13, wherein the bladder includes a coating having the pattern, and wherein the pattern includes a random or pseudorandom set of reference points.

15. The method of claim 13, further comprising:
generating, by the processor, output data indicating the characteristic;
simulating formation of the part based on the output data to generate a simulated part; and
based on the output data, generating a notification indicating a modification of a component or of a variable of a drape forming process to form the part.

16. The method of claim 15, further comprising sending a command to drape forming equipment, wherein the command instructs the drape forming equipment to modify a temperature or a vacuum pressure of a drape forming process based on the output data.

17. The method of claim 13, wherein detecting the characteristic includes:
comparing first positions of a set of reference points of the pattern in a first image of the sequence of images to second positions of the set of reference points of the pattern in a second image of the sequence of images to determine a distortion of the pattern;
determining a deformation based on the distortion of the pattern; and
determining a strain based on the deformation.

18. The method of claim 13, wherein detecting the characteristic includes, for each of a plurality of regions of the bladder, determining an order that the plurality of regions fixate to the draping tool based on the image data.

19. A computer-readable medium storing instructions executable by a processor to initiate, perform, or control operations, the operation comprising:
receiving, at a processor and from a memory, image data of a bladder that deforms to at least partially surround a draping tool, the bladder having a pattern that distorts as the bladder deforms wherein the image data includes a sequence of images of the pattern of the bladder as the bladder deforms about the draping tool; and
detecting, by the processor and based on distortion of the pattern indicated by the sequence of images, a characteristic associated with formation of a part using the draping tool and the bladder.

20. The computer-readable medium of claim 19, wherein detecting the characteristic includes:
comparing first positions of a set of reference points of the pattern in a first image of the sequence of images to second positions of the set of reference points of the pattern in a second image of the sequence of images to determine a distortion of the pattern;
determining a deformation based on the distortion of the pattern; and
determining a strain based on the deformation.

* * * * *